US006746329B1

(12) United States Patent
Duhamel

(10) Patent No.: US 6,746,329 B1
(45) Date of Patent: Jun. 8, 2004

(54) GAME APPARATUS AND METHOD FOR PLAYING A PLURALITY OF GAME SEGMENTS DISPLAYED USING A THREE-DIMENSIONAL REPRESENTATION

(75) Inventor: Gérald Duhamel, Drummondville (CA)

(73) Assignee: Labtronix Concept Inc., Drummondville (CA)

( * ) Notice: Subject to any disclaimer, the term of this patent is extended or adjusted under 35 U.S.C. 154(b) by 0 days.

(21) Appl. No.: 09/863,886

(22) Filed: May 3, 2001

Related U.S. Application Data

(60) Provisional application No. 60/201,677, filed on May 3, 2000.

(51) Int. Cl.[7] .................................... A63F 13/00

(52) U.S. Cl. ........................ 463/20; 463/32; 463/25; 273/138.2

(58) Field of Search ..................... 463/16–22, 12–13, 463/30–35; 273/143 R, 273, 293, 146, 292, 145 R, 138.2, 138.1, 139

(56) References Cited

U.S. PATENT DOCUMENTS 6,123,333 A * 9/2000 McGinnis et al. ............ 463/22
6,173,955 B1 * 1/2001 Perrie et al. .................. 463/20

* cited by examiner

*Primary Examiner*—Mark Sager
*Assistant Examiner*—Aaron Capron
(74) *Attorney, Agent, or Firm*—Ogilvy Renault; James Anglehart

(57) ABSTRACT

The present invention consists of a method of displaying games related to slot machine games. The method consists of: 1) using a three-dimensional structure as the basis of the display of The method with the primary plane of the three-dimensional structure as the center attraction of the screen of the electronic gaming device and the secondary planes around, 2) displaying the basic playing structure of The method on the primary plane, 3) allowing gamers to place bets on the primary plane and on other secondary planes, 4) starting The method with the display of moving symbols on all the different planes of the three dimensional structure until they are stopped, and 5) awarding prizes to The methods in regard to the bets placed in The method on the planes of the three-dimensional structure, therefore in regard to the different represented planes.

15 Claims, 8 Drawing Sheets

GAME APPARATUS AND METHOD FOR PLAYING A PLURALITY OF GAME SEGMENTS DISPLAYED USING A THREE-DIMENSIONAL REPRESENTATION

This application claims priority of U.S. provisional patent application serial No. 60/201,677 filed May 3, 2000.

FIELD OF INVENTION

The present invention relates to a casino-style game apparatus and method for playing a game having a plurality of game segments played substantially together and displayed using a three-dimensional representation. The invention relates further to casino-type games best known as slot machines games. Furthermore, these games are played on electronic gaming devices.

BACKGROUND OF THE INVENTION

Slot machines games are not new in the business. They were created many years ago and have been subject to many developments since.

The first kind of slot machine game on the market were one with mechanic reels. These machines became very popular when the technology of using step motors were used to drive the outcomes of the mechanical reels. Therefore, the outcome of the games stopped depending of the mechanical portion of the machine, but only on a random number generator determining previous to the final position of the reels the final outcome of the game. Since then, mechanical slot machines have been very popular.

However, the mechanical slot machines have an important limitation: the configuration of the reels. Hence forth, new configurations of games have been developed such as the 8 line slot games. For this game, game developers needed nine (9) reels disposed in a matrix manner. The best way to do that was on electronic gaming devices; gaming cabinets offering an electronic display allowing to display virtual reels without having the problem of physical configuration.

Nevertheless, independent of the type of display used, mechanic or electronic, the outcome of the games are determined by a random number generator.

To obtain interesting displays offering new possibilities to game developers, the industry needed more powerful game platforms with more powerful processors and more memory, etc. During the last decade while the electronic gaming devices started to become popular, technology offered new developments. It is now possible to offer games demanding a lot from the platform. Therefore, technology is ready for new demands.

The taste of the customer also has changed during the last decade. At this moment in the history of the electronic gaming business, gamers want games offering more winning possibilities, more action, games with fewer losing streaks.

SUMMARY OF THE INVENTION

It is the objective of the invention to present a game offering new interest to gamers by offering a new, innovative and interesting display.

Another objective is to provide more possibilities of winnings within a single play.

Another objective is to provide gamers new possibilities of winnings that were not possible before the present invention.

According to the objectives above, the invention consists of a new innovative method of displaying a game on the screen of an electronic gaming device. Furthermore, it is a method of displaying a slightly changed game as relates to slot games, with more possible wins, more action, therefore more bets from gamers. Consequently, the new display should allow gamers to clearly view the outcome in regard to each of these bets.

The method consists of: 1) using a three-dimensional structured layout in the game display with the primary plane or facet of the three-dimensional structured layout having central importance while leaving the secondary planes or facets with less importance, 2) displaying the basic playing structure of the game on the central plane, 3) allowing gamers to place bets on the central playing plane and on other numerous secondary planes, 4) starting the game with a display of moving symbols on all the different planes of the three dimensional structure until they are stopped, and 5) awarding prizes to the gamers in regard to the bets placed in the game on all planes of the three-dimensional structure, therefore in regards to the different playing displays of the game.

To allow gamers to view their wins and losses, the display allows gamers to clearly see all the different playing displays, therefore all planes of the three-dimensional structure where bets were placed. Furthermore, to accomplish it, there are two basic possibilities. First, to display one at a time each planes centrally in the center of the screen of the electronic gaming device. Two, to unfold the three-dimensional structure to simultaneously show all the different planes of the structure where bets were placed.

However, the second option allows gamers to see all the planes simultaneously, but does not display the planes as clearly as the first option.

New and innovative criteria of winning can be developed for this method of display, such as for a cubic structure to give winnings to gamers with an outcome comprising three identical symbols on adjacent corners of different playing planes.

Furthermore, the three-dimensional structure applied in this method of display can be in cube, tetrahedron, or even pyramidal structure, Many possibilities exists. The only limitation according to the method of display is to allow gamers to clearly view all information concerning the end outcome of the game.

The invention also provide a computer program comprising code means adapted to play a game with the execution of all steps of the method described above, embodied on a computer readable medium or embodied in an electrical or electromagnetic signal.

BRIEF DESCRIPTION OF THE DRAWINGS

These and other features, aspects and advantages of the present invention will become better understood with regard to the following description and accompanying drawings, wherein.

DETAILED DESCRIPTION OF THE PREFERRED EMBODIMENT

The preferred embodiment of this invention consists of an electronic gaming device or a gaming apparatus comprised of an electronic display showing the outcome of a game, with the different elements of the outcome being randomly determined by a random number generator. The different elements of outcomes can be described as game segments allowing players to obtain a prize result in regard to the bet placed for each of the game segment. The electronic gaming device is comprised of a means to receive credit value, means allowing gamers to place bets such as touch screen controls, means to start the play and therefore the random determination of the outcome, and a means to award prizes to gamers such as a ticket printer.

Figure 1:
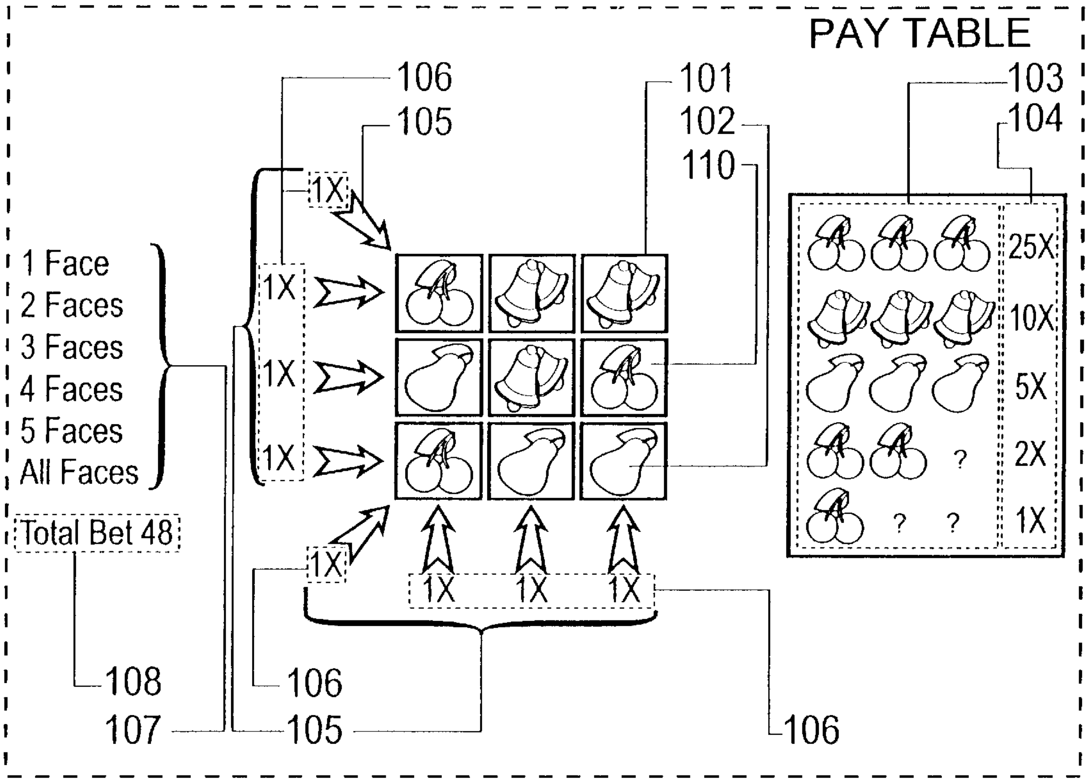
FIG. 1 is a schematic representation of a play screen according to the first embodiment.

FIG. 1 shows what is displayed on the playing screen of the electronic gaming device: a three-dimensional structure 101 with one plane 102 being clearly displayed without any angular deformation. The three-dimensional structure can be for example one of an oblique view of a cube, a perspective view of a cube, and a warped view of a cube. An example of a warped view of a cube is FIG. 8. Furthermore, a table of the winning combination symbols 103 is displayed with the associated prizes 104. A set of arrows 105 shows all the lines or potential dispositions where gamers can place bets and the amount 106 bet on each of these dispositions. A betting control allows gamers to place bets on the desired number of planes in the three-dimensional structure with the information displayed 107 on the screen of the electronic gaming device. Additionally, a display presents the total amount of the bets 108. With this embodiment, the means to place bets consists of pressing buttons controls, touch screen controls, or an association of both.

Figure 2:
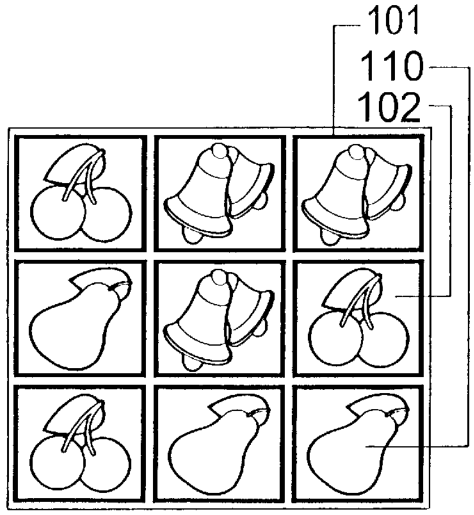
FIG. 2 is a partial display of the play screen in FIG. 1.

A closer look of the three-dimensional structure 101, FIG. 2, shows a presentation of only one plane 102 at a time to limit the information accessible to gamers, resulting in increased clarity and to avoid boredom or excessive stress to gamers with this embodiment using a game related to an 8line game. The plane 102 is comprised of a number of symbols 110 disposed as a matrix display. Furthermore, and areas corresponding to dispositions of symbols 110 (lines) where it is possible to place bets such as represented in FIG. 1. The whole constituting a geometric shape, i.e. a square. Gamers can wager bets on lines indicated by arrows 105. Furthermore, as represented in FIG. 1, eight (8) different lines of symbols 110 per plane are available to wager on using this three-dimensional structure 101.

Figure 3:
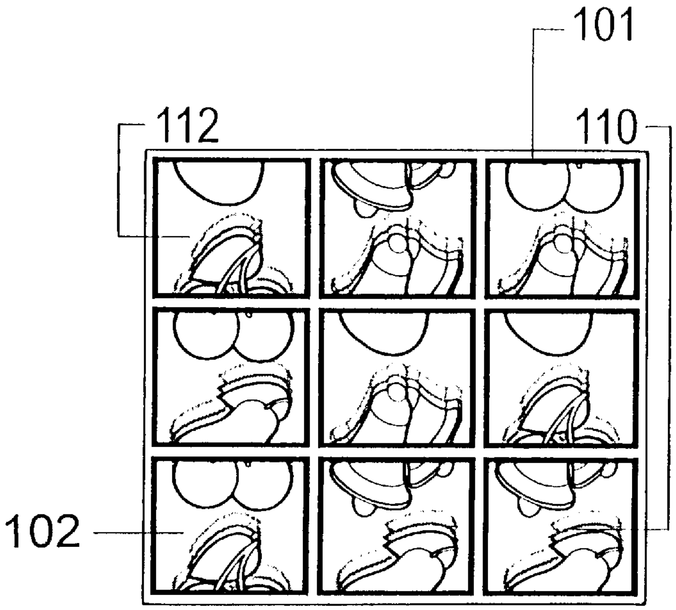
FIG. 3 is a schematic representation of the display that in FIG. 2 further in progress of play.

When all the wagers are made, the gamer activates the control for selection of new symbols 110, which determine the final outcome and consequently whether prizes are won or not. At this time, see FIG. 3, symbols change on the visible plane of the three-dimensional structure 101 by displaying a sequence of moving symbols 112 simulating symbols processing on the periphery of a true reel. Simultaneously, symbols 110 are randomly selected according to the result of the random number generator of the electronic gaming device. Afterwards, the moving symbols 112 slow down to stop on a display showing the randomly determined symbols 110.

Figure 4:
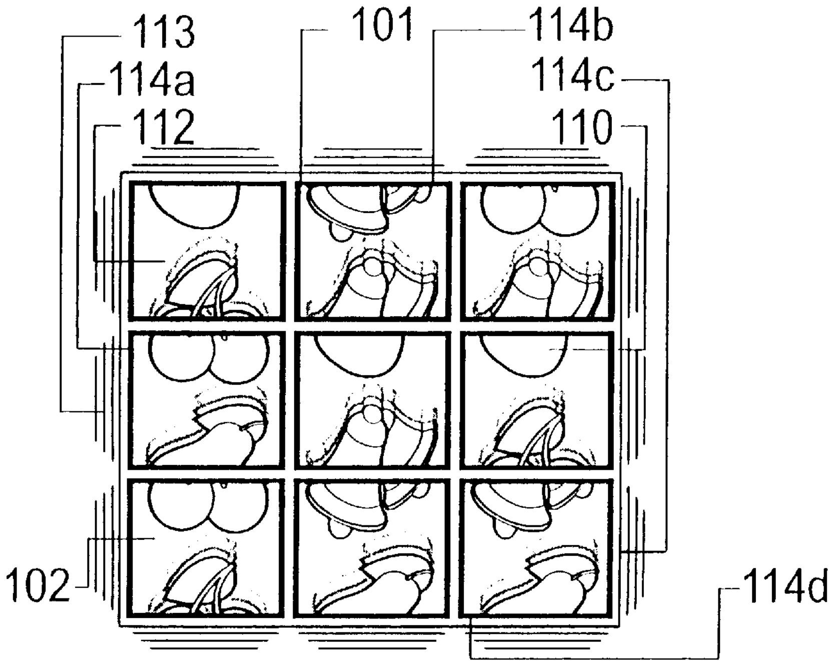
FIG. 4 is a schematic representation of an alternative display that in FIG. 3.

To increase confidence of gamers on the slot machine, FIG. 4, a process displaying indefinite moving shades 113 or symbols showing angular deformations can also be applied on planes 114 displayed near the limits between the non-visible or hardly visible planes and the central plane 102 of the three-dimensional structure 101. It gives confidence to gamers that all the symbols 110 on all the planes of the three-dimensional structure 101 are changing, therefore randomly determined during each play.

Figure 5:
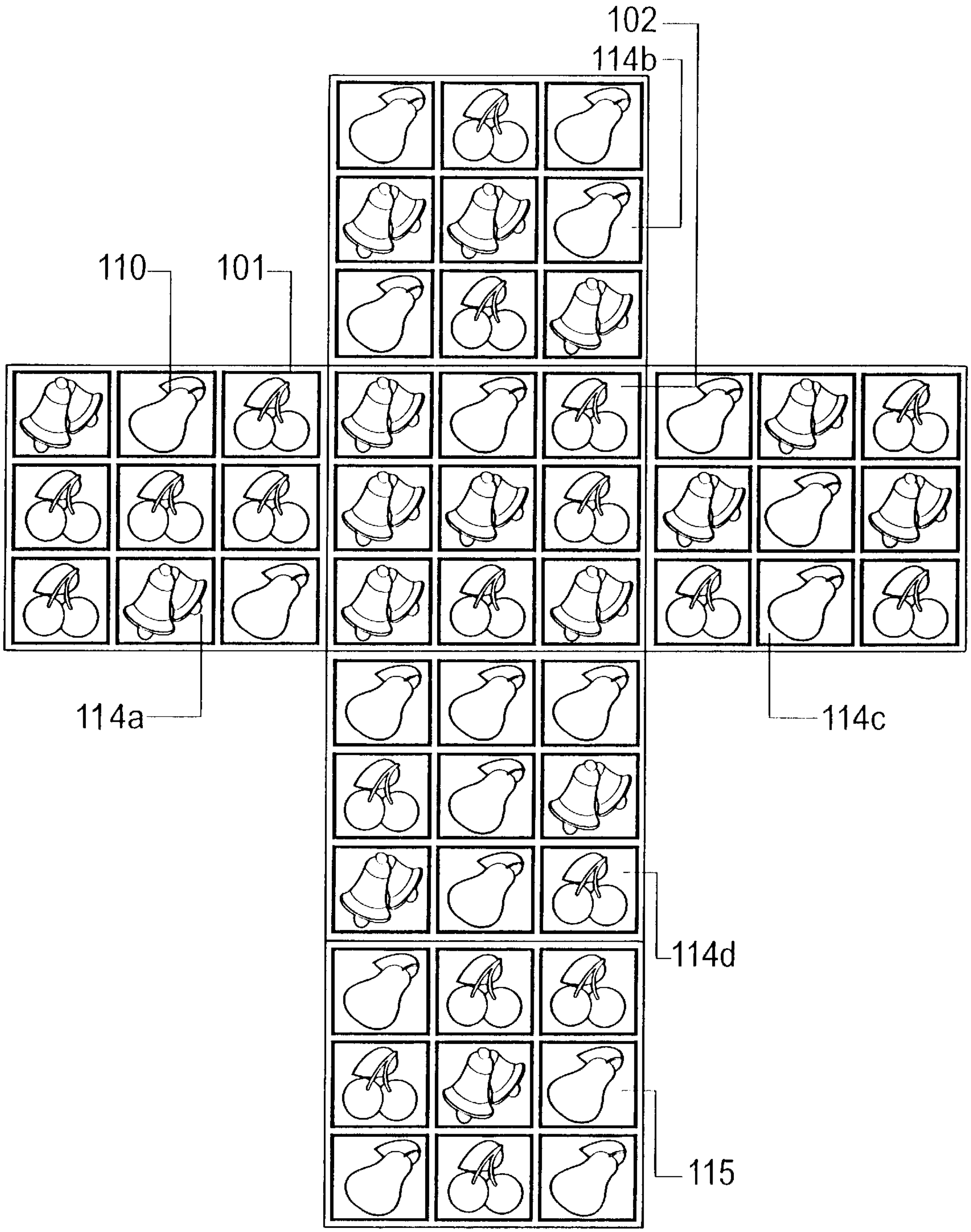
FIG. 5 is a schematic representation of the display that in FIG. 3 further in progress of play.

When all the symbols 110 are selected and stopped, the step of evaluating winning outcomes begins. During this step, gamers want to be able to see and verify by themselves all the planes; the central plane 102 and the different adjacent and hidden planes 114 and 115 of the three-dimensional structure 101, or at least see their winnings. One method used for this is to show all the planes 102, 114 and 115 simultaneously, see FIG. 5, by unfolding the planes of the three-dimensional structure 101 onto one flat surface. With this method, verification of all the planes 102, 114 and 115 is fast and easy for most of the possible winning disposition.

Figure 6:
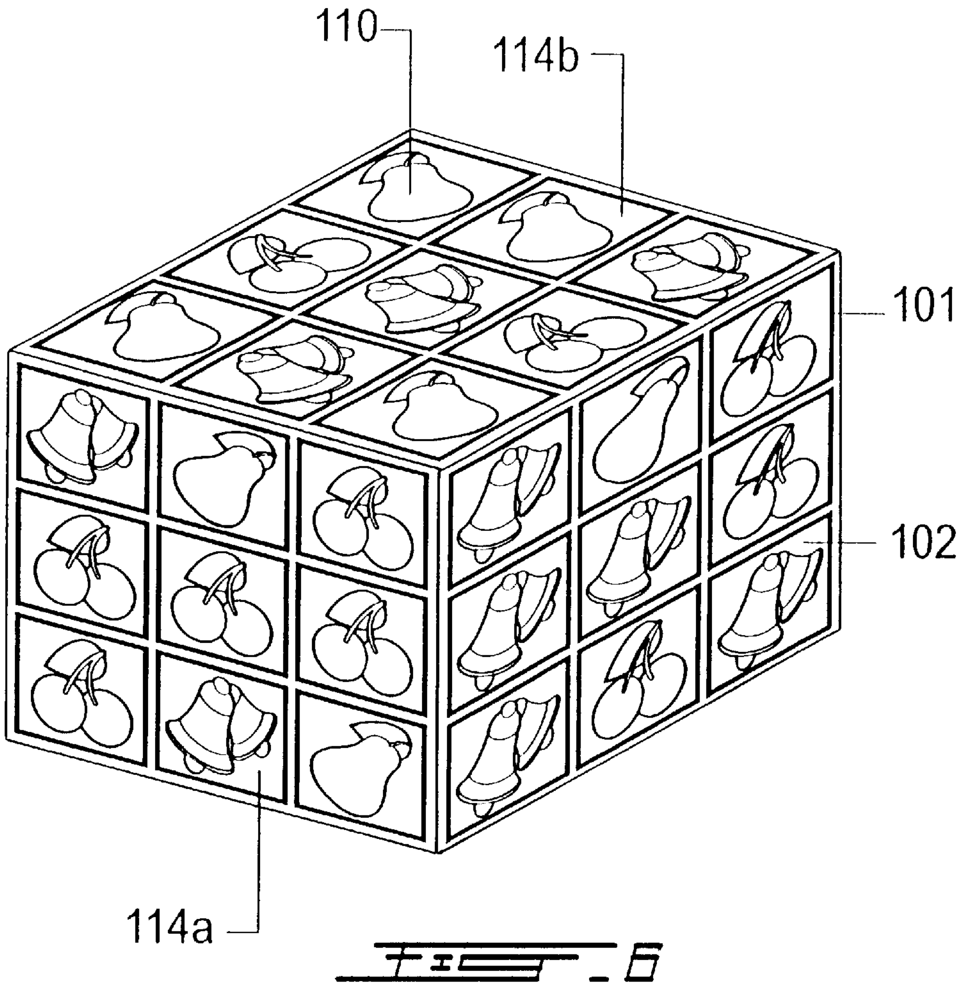
FIG. 6 is a schematic representation of an alternative display that in FIG. 5.
Figure 7:
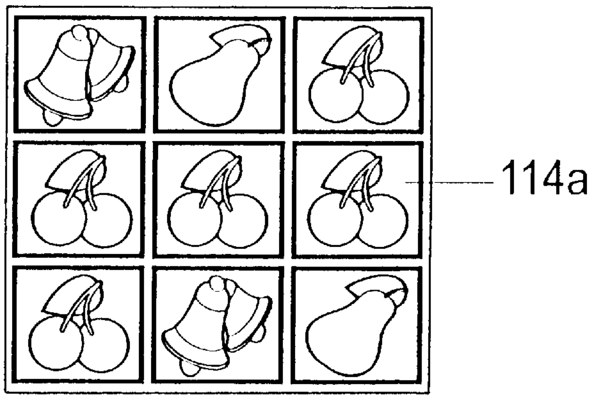
FIG. 7 is a schematic representation of the display that in FIG. 6 further in the progress of play.

Another method to verify planes 102, 114 and 115 is to show them sequentially, one at a time. This method of displaying the three-dimensional structure 101 consists at rotating around a point or an axis the three-dimensional structure 101. With smooth virtual movement of the three-dimensional structure 101, it is easy and appealing for gamers to verify their bets. FIG. 6 shows a mid-state view of rotation of the three-dimensional structure 101 during the verification of the winnings. FIG. 7 shows a clear display of the plane 102*d*. Winnings are displayed and then awarded to the gamer.

After the verification of the winnings, a new game can be played including placing new bets, a new random selection of symbols and awarding the prizes won by the gamer.

Figure 8:
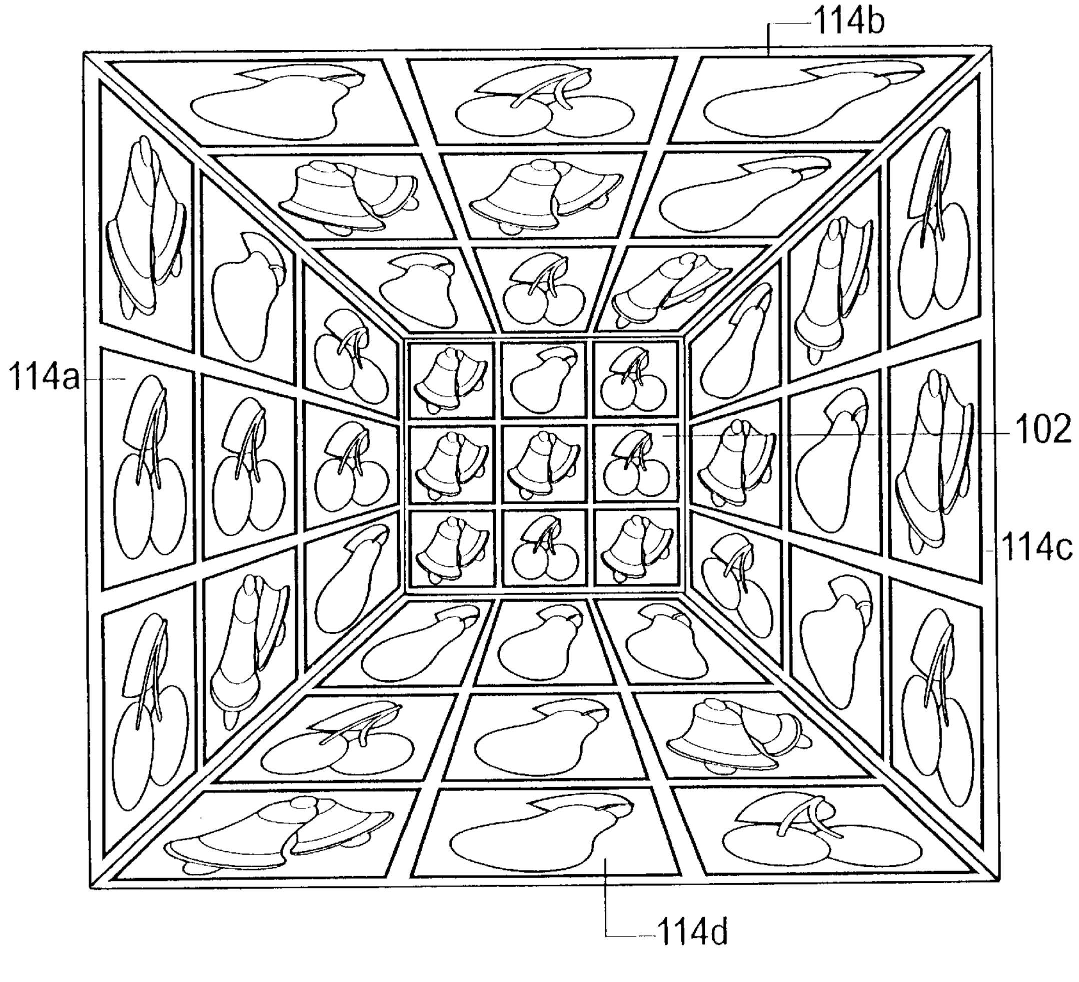
FIG. 8 is a schematic representation of an alternative display that in FIG. 5.

Additionally, another option to display the different planes of a three-dimensional structure is to place a virtual camera inside the structure, therefore displaying the inside of the three-dimensional structure. Consequently, besides of displaying only some of the planes 114 touching the central plane 102 with them appearing further, as the symbols 110 are further from the central plane 102, they look closer. FIG. 8 illustrates this option with exactly the same information than that in FIG. 5. Furthermore, with using a virtual camera disposed inside the three-dimensional structure, it is appropriate and even suggested to remove plane 115 or planes of the three-dimensional structure disposed at the opposite side of the viewing direction of the camera, therefore at the back of the camera. Consequently, a cube would have a maximum of five (5) active planes 102 and 114. Moreover, gamers would always see all the active planes 102 and 114 with the central plane 102 showing no angular distortion.

Figure 9:
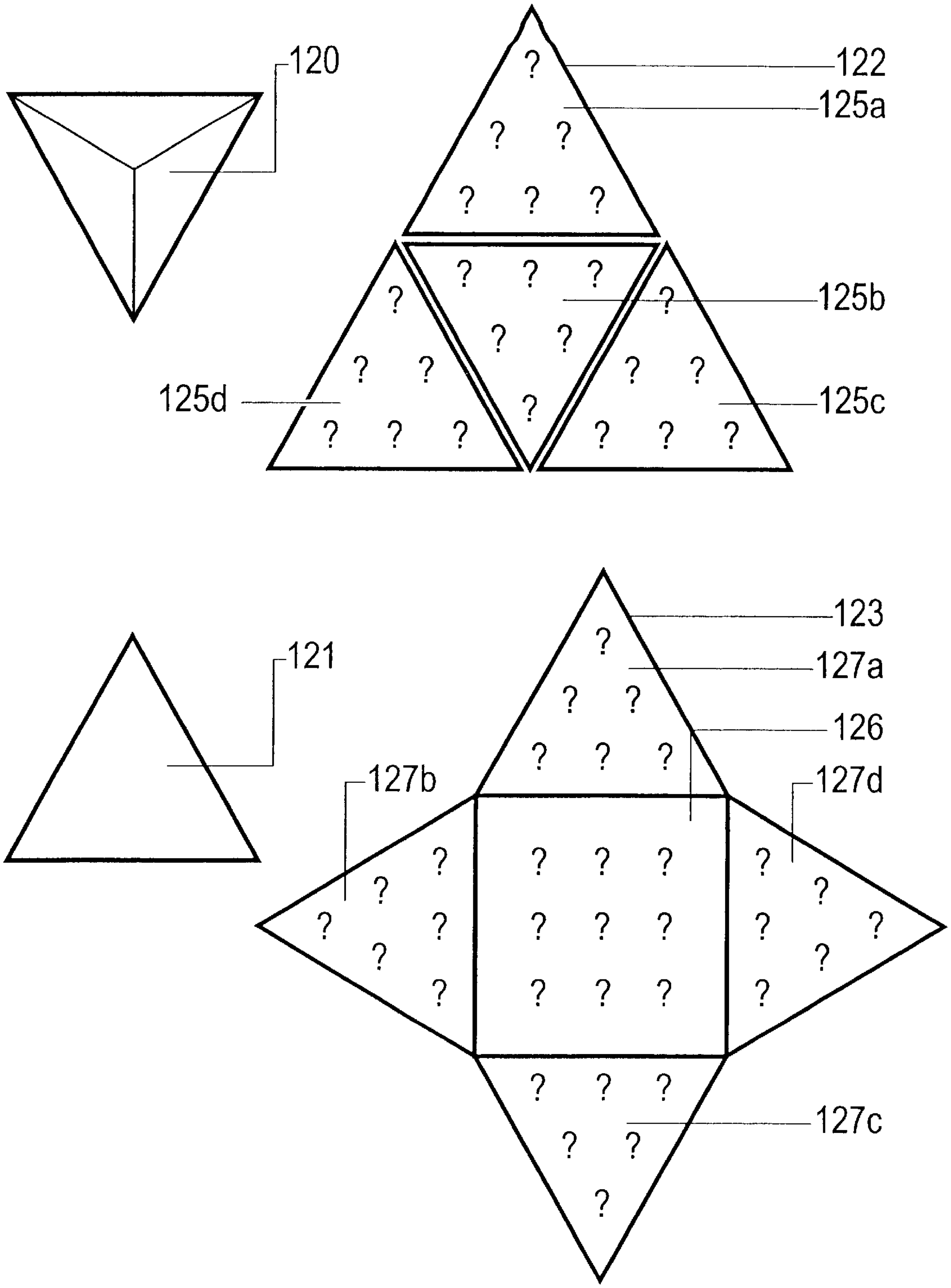
FIG. 9 is layouts of alternative three-dimensional structures.

FIG. 9 shows alternative three-dimensional structures 120 and 121 that can be used with this method, furthermore to avoid any problem of viewing the structure, the figures are also shown in unfolded presentations 122 and 123 of the structures. More precisely, the first structure in FIG. 9 shows a tetrahedron 120 and 121 composed of four (4) triangular planes 125 with a possibility of six (6) symbols per planes. The second structure of FIG. 9 shows a pyramidal structure 121 and 122 composed of five (5) planes, one (1) square 126 and four (4) triangles 127. With a three-dimensional structure composed of more than one basic geometrical shape such as the pyramidal structure 121 and 122, the steps of placing bets should include showing all the different basic geometrical shapes where wagering is possible.

Figure 10:
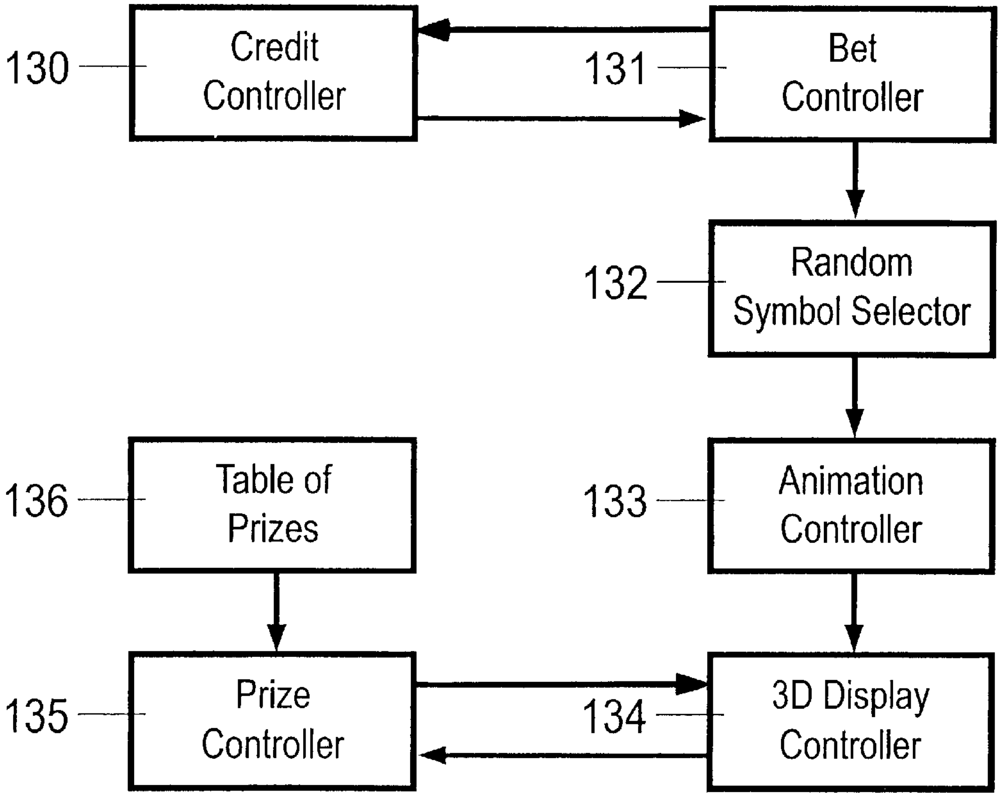
FIG. 10 is a block diagram according to the present invention.

FIG. 10 shows as a block diagram of all the controls needed in the process of playing the game of the present invention. First, a credit controller 130 records and computes all the credits introduced in the electronic gaming device and available for betting. Then, a bet controller 131 distributes the bets as the gamer desires using the bet controls. If more money is needed to place additional bets, it is always possible to add more. When all the bets are placed, a random symbol selector 132 selects, using random process, new symbols for all the planes of the three-dimensional structure. An animation controller 133 displays a sequence of moving symbols slowing and stopping on selected symbols. After, the 3D-display controller 134 and prize controller 135 perform the verification of the bet to award prizes regarding the bet. Depending on the preferred display for the evaluation, the 3D-display controller 134 performs an internal viewing, unfold viewing or an external viewing with rotation display. After winnings are successfully evaluated, the prize controller 135 refers to a table of prizes 136 to award the corresponding prizes.

Figure 11:
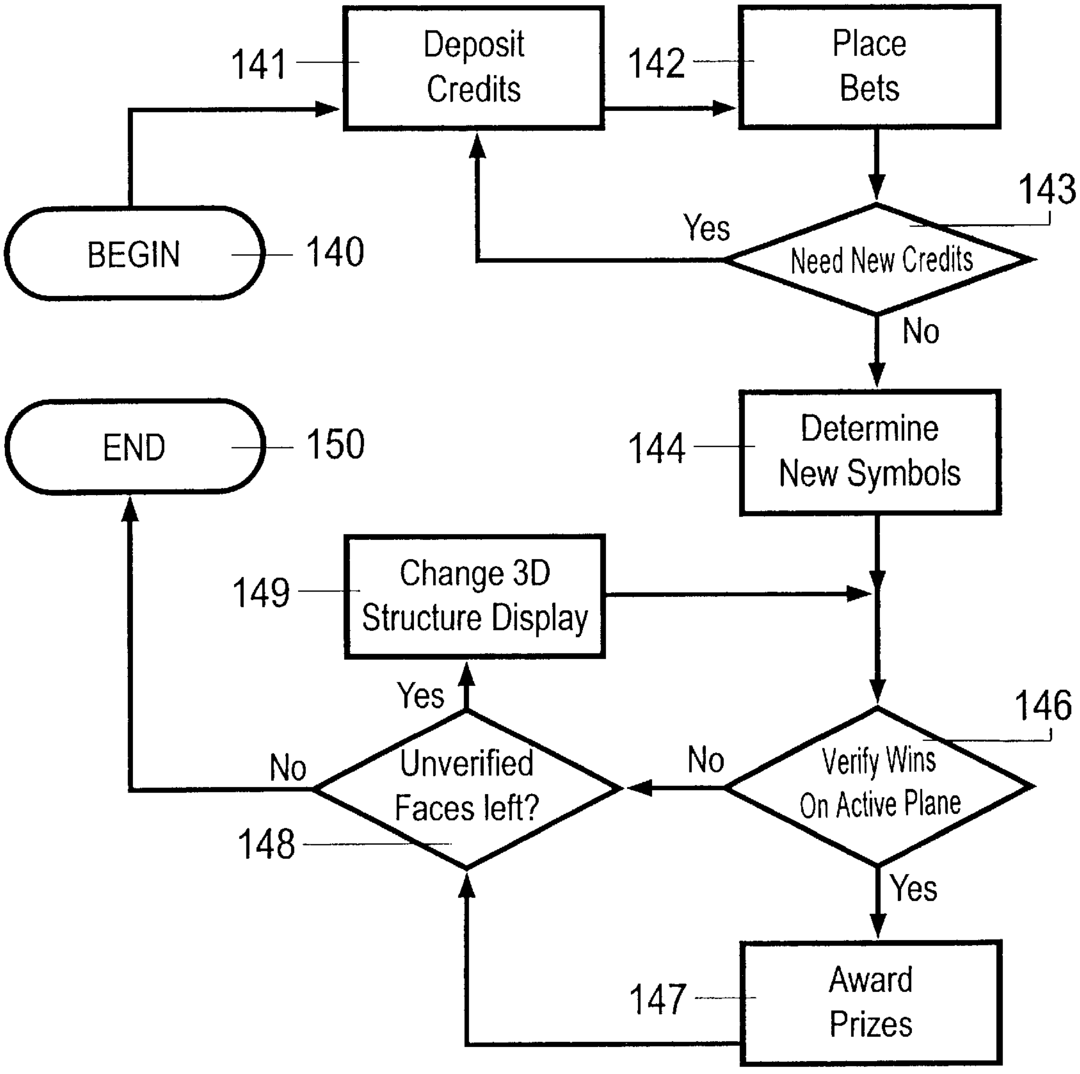
FIG. 11 is a flow chart according to the present invention.

The steps to playing a play using the game of the present invention represented in FIG. 11 begin 140 by placing credits 141 in the electronic gaming device. After, the gamer wagers bets 142 on lines and dispositions of symbols they want to bet on using bet controls such as touch screen controls. If the amount of credits placed in the electronic gaming device is not enough 143 for all these bets, the gamer can further add credits 141 in the device. When all bets are placed, a new selection of symbols 144 replaces the old ones on the three-dimensional structure with a transitory sequence of animation. When all the symbols are stopped, the steps of sequentially verifying 146 all the planes and awarding prizes 147 begin. For each plane of the three-dimensional structure presenting bets, the electronic gaming device sequentially displays each plane 149 to the gamer, verifies if any winnings 146 are present on the displayed plane and award prizes 147 corresponding to these winnings. Turn the three-dimensional structure to the next unverified plane. When all the planes are verified 148 and all the prizes are awarded 147, the play is over 150.

The descriptions of the above embodiments of the present invention have been presented for the purpose of illustration and do not intend to limit the invention. The scope of the present invention is defined by appended claims. Various modifications and changes may be made without departing from the scope of the invention as set forth in appending claims.

What is claimed is:

1. A casino-style game apparatus for playing a game, the apparatus comprising:

a game controller independently generating a number of at least two prize-determining outcomes; and a display system generating a display of a three-dimensional structure having at least two contiguous or adjoining facets or planes and providing a graphical representation of each of said number of outcomes on separate ones of said facets or planes of said three-dimensional structure.

2. The apparatus as claimed in claim 1, further comprising a user input device allowing a user to control a manner in which said outcomes are displayed using said three-dimensional structure.

3. The apparatus as claimed in claim 2, said display generates a primary one of said facets or planes in a central position with at least another one of said facets or planes contiguously adjacent to said primary facet or plane.

4. The apparatus as claimed in claim 3, wherein at least one of said outcomes are displayed outside said structure.

5. The apparatus as claimed in claim 1, wherein a representation of said three-dimensional structure is one of an oblique view of a cube, a perspective view of a cube, and a warped view of a cube.

6. The apparatus claimed in claim 1, wherein a representation of said three-dimensional structure is an internal view of a cube with a display of at least one facet.

7. The apparatus as claimed in claim 1, wherein a game format of said outcomes is identical on at least two of said facets of a single structure.

8. The apparatus as claimed in claim 1, further comprising an evaluation controller associating at least two of said outcomes of a single structure for the evaluation of a single prize.

9. A method of playing a casino-style game having a plurality of independently generated prize-determining outcomes, the method comprising:

accepting a bet and associating said bet with a first outcome;

accepting at least one additional bet and associating said additional bet to at least a second outcome;

independently selecting a number of outcomes corresponding to said bet and said at least one additional bet;

generating a display of a three-dimension structure having at least two facets or planes providing a graphical representation of each of said number of outcomes on separate ones of said facets or planes of said three-dimensional structure;

determining a prize result based on said outcomes; and awarding said prize.

10. The method as claimed in claim 9, further comprising the step of displaying a primary facet or plane in a central position with at least one secondary one of said facets or planes contiguously adjacent to said primary facet or plane.

11. The method as claimed in claim 10, further comprising the step of sequentially displaying at least two of said facets or planes in a central position.

12. The method as claimed in claim 11, further comprising the step of displaying said three-dimensional structure as an oblique view, a perspective view, or a warped view.

13. The method as claimed in claim 12, wherein the step of determining a prize result comprises to evaluate at least two of said outcomes in regard one to each other.

14. The method as claimed in claim 13, wherein said three-dimensional structure is a cube.

15. The method as claimed in claim 14, wherein said method of play is executed automatically in an electronic gaming device.

* * * * *